(12) United States Patent
Nozaki

(10) Patent No.: US 6,601,346 B2
(45) Date of Patent: Aug. 5, 2003

(54) WEATHER STRIP FOR MOTOR VEHICLE HAVING A SOLID MEMBER INSERTED THEREIN

(75) Inventor: Masahiro Nozaki, Nishikasugai (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/077,774

(22) Filed: Feb. 20, 2002

(65) Prior Publication Data

US 2002/0112405 A1 Aug. 22, 2002

(30) Foreign Application Priority Data

Feb. 21, 2001 (JP) .................................... 2001-044495

(51) Int. Cl.7 .............................................. E06B 7/22
(52) U.S. Cl. ..................................... 49/498.1; 49/480.1
(58) Field of Search ........................... 49/498.1, 475.1, 49/492.1, 480.1, 484.1, 495.1

(56) References Cited

U.S. PATENT DOCUMENTS

| 4,310,164 A | * | 1/1982 | Mesnel ........................ 277/642 |
| 4,819,381 A | * | 4/1989 | Kitaura et al. .............. 49/489.1 |
| 4,858,385 A | * | 8/1989 | Bright ........................ 49/490.1 |
| 4,991,352 A | * | 2/1991 | Hyer ........................ 49/489.1 |
| 5,050,349 A | * | 9/1991 | Goto et al. .................... 49/441 |
| 5,124,189 A | * | 6/1992 | Arima ......................... 428/122 |
| 5,489,104 A | * | 2/1996 | Wolff .......................... 277/646 |
| 5,715,632 A |   | 2/1998 | Nozaki |
| 5,826,378 A | * | 10/1998 | Gallas ........................ 277/644 |
| 5,918,421 A |   | 7/1999 | Nozaki |
| 6,250,018 B1 |  | 6/2001 | Kawai et al. |

FOREIGN PATENT DOCUMENTS

JP      2000-185560      7/2000

* cited by examiner

Primary Examiner—Gregory J. Strimbu
(74) Attorney, Agent, or Firm—Posz & Bethards, PLC

(57) ABSTRACT

A weather strip for the attachment to a periphery of a door frame of a vehicle door by clips, which weather strip is capable of preventing water from leaking into a vehicle compartment through spaces located between the weather strip and the door frame and between the clips. The weather strip includes a base portion which is secured to a weather strip attaching surface of the door frame at intervals using the clips, a water stopping lip which is formed at an outside end of the base portion, and a solid member composed of a rubber which is more solid than the material of the base portion and is embedded in the outside end of the base portion so as to extend in a longitudinal direction thereof, thereby increasing the hardness of the outside end of the base portion and maintaining a high pressing force of the water-stopping lip against the weather strip attaching surface.

5 Claims, 4 Drawing Sheets

WEATHER STRIP FOR MOTOR VEHICLE HAVING A SOLID MEMBER INSERTED THEREIN

CROSS-REFERENCE TO RELATED APPLICATION

This application is related to and claims priority from Japanese patent application No. 2001-44495, incorporated herein by reference.

BACKGROUND OF THE INVENTION

1. Field of the Invention

The present invention relates to a weather strip and, more particularly, to a weather strip for attachment to a periphery of a door frame of a motor vehicle.

2. Description of Related Art

As shown in FIG. 1, a weather strip 10 is attached to a periphery of a door 12 of a motor vehicle. When the door 12 is closed, the weather strip 10 seals between the door 12 and a door opening portion of a vehicle body.

Generally, to attach the weather strip 10 to a door frame 14 of the door 12, the weather strip 10 is mounted on a metal retainer provided along a periphery of the door frame 14. Recently, to reduce the weight of vehicle doors and decrease manufacturing costs thereof, the weather strips have been frequently attached with clips without using metal retainers.

FIG. 2 illustrates a conventional weather strip 10A which is attached to the door frame 14 with clips 16. The weather strip 10A is composed of an extruded body of a sponge rubber, of which the specific gravity generally ranges from 0.4 to 0.7. The weather strip 10A has a base portion 18, a tubular main seal portion 20 and a sub-seal lip portion 22. Clips 16 are mounted on the base portion 18. By press-fitting the clips 16 into clip holes formed in a weather strip attaching surface 24 of the door frame 14, the weather strip 10A is fastened to the door frame 14 by clips 16. When the door 12 is closed, the main seal portion 20 and the sub-seal lip portion 22 contact and press a door opening portion 26 of the vehicle body.

The above-described attaching structure using clips 16, however, has the following problem. Normally, the weather strip 10A is fastened to the weather strip attaching surface 24 at intervals of about 100 to 130 mm by clips 16. Between adjacent clips 16, the pressing force of the base portion 18 against the weather strip attaching surface 24 is small. Consequently, between adjacent clips 16, the bottom surface of the base portion 18 may deform upwardly and separate from the weather strip attaching surface 24 to degrade the sealing properties.

On the other hand, the sub-seal lip portion 22 has a small lip 28 on an outside surface thereof to seal between the sub-seal lip portion 22 and a door projecting portion 30 which projects from the weather strip attaching surface 24 around the door frame 14. The resultant seal, however, may become insufficient locally due to variations in the attached positions of the weather strip 10A, and consequently, when vehicles are washed under a high pressure, water may intrude inwardly via a gap between the sub-seal lip portion 22 and the door projecting portion 30.

Especially, in an upper frame part 32 (FIG. 1) of the door frame 14, which extends along a side of a vehicle roof, water is not readily drained, as compared to a vertical part along a pillar of a vehicle body. Accordingly, the water intruded inwardly of the above gap may enter and cross the space formed between the bottom surface of the base portion 18 and the weather strip attaching surface 24, and leak into a vehicle compartment.

In order to solve this problem, as shown in FIG. 3, it has been proposed to continuously form a notched step 34 along an outside lower end of the base portion 18 of a weather strip 10B in a longitudinal direction thereof, and dispose a high expansion sponge member 36 (specific gravity: 0.1~0.3) which has a thickness greater than the depth of the notched step 34 integrally with the notched step 34 (Publication of Japanese unexamined patent application No. 2000-185560).

The sponge member 36 is, however, composed of a soft material having a high expansion, as compared to the material of the weather strip 10B, and consequently, does not serve to prevent the base portion 18 from deforming upwardly and separating from the weather strip attaching surface 24 between adjacent clips 16. Furthermore, the thickness of the sponge member 36 which has a high expansion is locally nonuniform, and consequently, it is difficult to set the sealing properties of the sponge member 36 uniform over the entire length thereof.

SUMMARY OF THE INVENTION

Accordingly, it is an object of the present invention to provide a weather strip to be attached to a periphery of a vehicle door frame with clips, which is capable of preventing water from leaking into a vehicle compartment across a space occurring between the weather strip and the door frame between clips.

The weather strip in accordance with the present invention includes a base portion adapted to be secured to a periphery of a door frame with clips at predetermined intervals, a seal portion for contacting and pressing a door opening portion of a vehicle body upon closing of a vehicle door, a water-stopping lip formed along an end of the base portion outside clips-securing positions thereof such that a projecting end thereof contacts and presses the door frame upon attaching of the weather strip, and a longitudinal solid member composed of a material solider than that of the base portion, which is embedded in the end of the base portion so as to extend in a longitudinal direction thereof.

With the weather strip in accordance with the present invention, by virtue of the solid member embedded in the end of the base portion thereof, the base portion is prevented from deforming upwardly and separating from the weather strip attaching surface between adjacent clips, and the pressing force of the water-stopping lip against the door frame is ensured.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Figure 4:
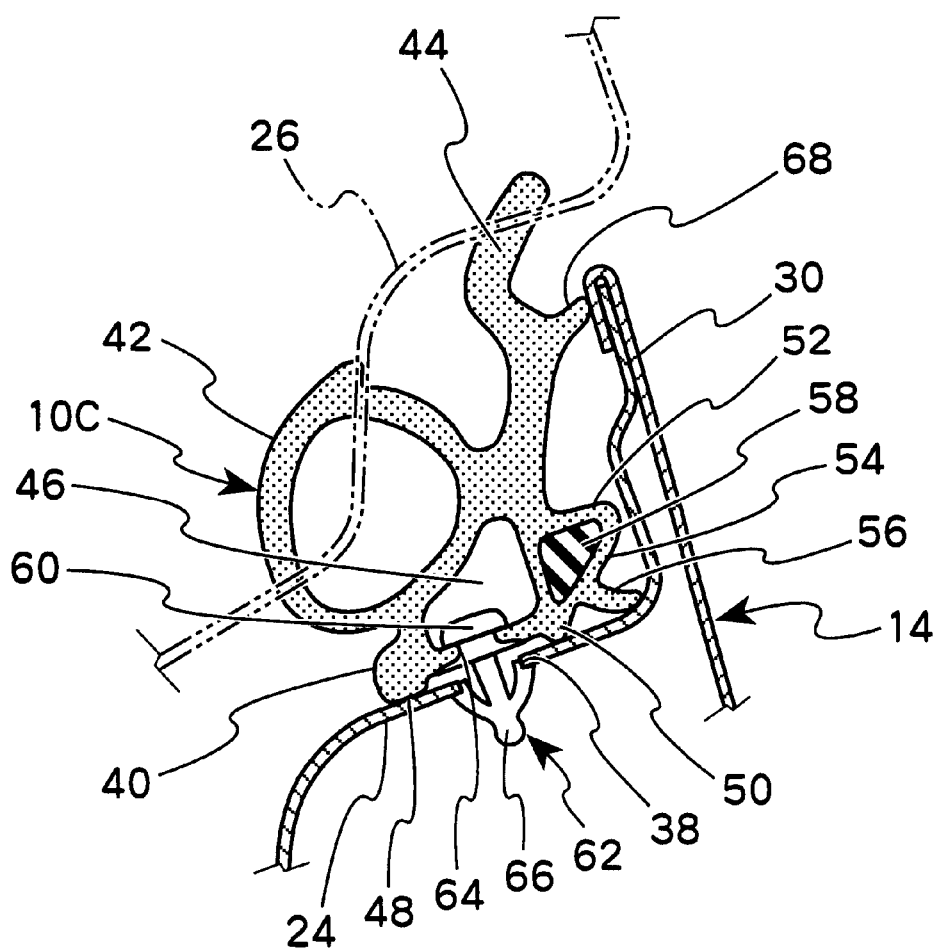
FIG. 4 is a cross-sectional view of a first embodiment of a weather strip in accordance with the present invention, which is taken along the line II—II of FIG. 1.

FIG. 4 is a cross-sectional view of a first embodiment of the present invention. As shown, a weather strip attaching surface 24 is formed along a periphery of a door frame 14, and a door projecting portion 30 extends from an outside end of the weather strip attaching surface 24.

A weather strip 10C is composed of an extruded body of a foamed EPDM rubber or a foamed thermoplastic olefin elastomer (TPO), and has a base portion 40, a tubular main seal portion 42 which projects from the base portion 40, and a sub-seal lip portion 44 which extends upwardly from the base portion 40 outside the main seal portion 42. A hollow space 46 is formed in the base portion 40 so as to extend in the longitudinal direction thereof. Projection ribs 48 and 50 are respectively formed at an inside end and an outside end of a bottom surface of the base portion 40 in a longitudinal direction thereof.

A protrusion 52 protrudes outwardly from the base portion 40. The protrusion 52 has an approximately triangular cross-section. A rounded end thereof projects outwardly while a lower surface 54 thereof extends obliquely to the weather strip attaching surface 24, and is continuous with the projection 50. A water-stopping lip 56 projects from an approximately widthwise center of the lower surface 54 at approximately right angles thereto.

A longitudinal solid member of which the specific gravity is about 1.2 is embedded in the protrusion 52 so as to extend in a longitudinal direction of the base portion 40. The solid member 58 has a cross-section approximately similar to that of the protrusion 52, and is formed by co-extrusion with the weather strip 10C. The solid member 58 is composed of a non-foamed EPDM rubber or non-foamed thermoplastic olefin elastomer. And the solid member 58 may be composed of a microfoamed EPDM rubber or foamed thermoplastic olefin elastomer, each having an expansion (specific gravity: 0.8~1.0) which is smaller than that of the main body of the weather strip 10C.

Clips 62 are mounted on the base portion 40 by press-inserting heads 60 of clips 62 into the hollow space 46 thereof through clip holes 64 formed in about a widthwise center of the bottom wall of the base portion 40. And by press-fitting locking parts 66 of the clips 62 into clip holes 38 formed in the weather strip attaching surface 24, the weather strip 10C is fastened to the door frame 14 using the clips 62. When the door 12 is closed, the main seal portion 42 and the sub-seal lip portion 44 come in elastic contact with a facing door opening portion 26 of the vehicle body.

With the present embodiment, in the vicinity of the clips 62, the projection ribs 48 and 50 and water-stopping lip 56 strongly press the weather strip attaching surface 24 of the door frame 14. In addition, since the hardness of the base portion 40 is increased by virtue of the solid member 58 embedded in the protrusion 52, the water-stopping lip 56 does not deform and separate from the weather strip attaching surface 24 between adjacent clips 62, and accordingly, the pressing force of the water-stopping lip 56 against the weather strip attaching surface 24 is maintained, similarly to that in the vicinity of the clips 62.

With this arrangement, if water intrudes inwardly via a gap between the door projecting portion 30 and the small lip 68 of the sub-seal lip portion 44, the water does not further intrude inwardly of the water-stopping lip 56.

Figure 5:
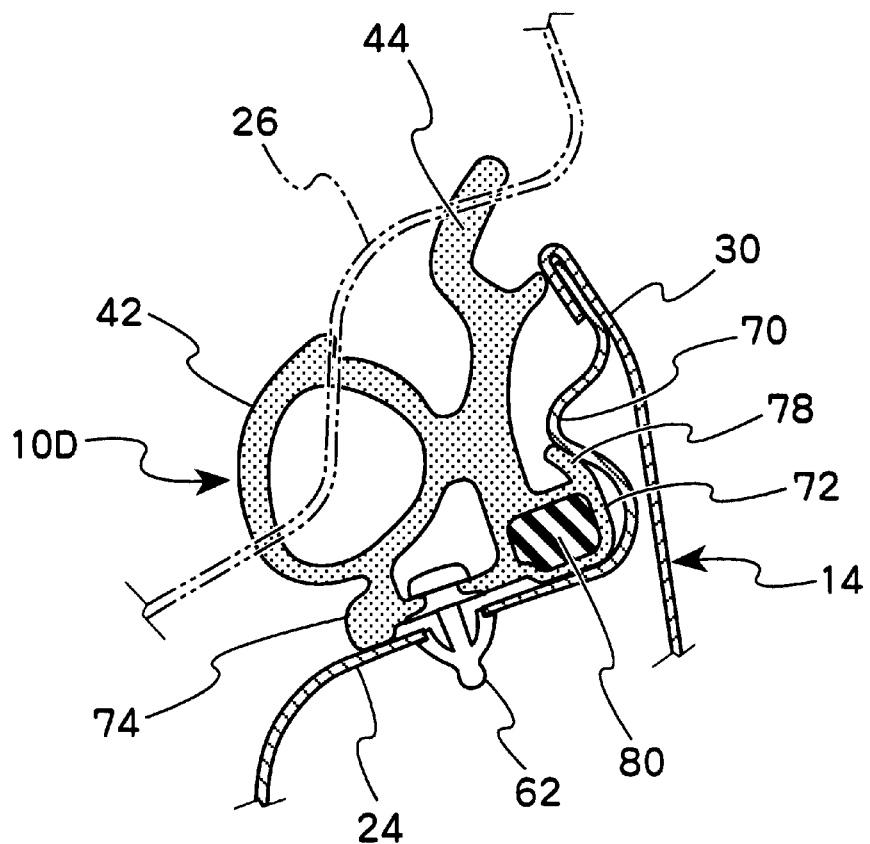
FIG. 5 is a cross-sectional view of a second embodiment of a weather strip in accordance with the present invention, which is taken, similarly to FIG. 4.

FIG. 5 illustrates a second embodiment of the present invention, which differs from the first embodiment in the arrangement of the outside end of the base portion. Other configurations of the second embodiment are substantially identical to those of the first embodiment of FIG. 4.

As shown, a convex part 70 is formed in an inside surface of the door projecting portion 30 of the door frame 14 so as to project towards the inside of the vehicle body. A protrusion 72 protruding from a base portion 74 of a weather strip 10D has such a bottom surface as to contact the weather strip attaching surface 24 of the door frame 14. A water-stopping lip 78 stands upright on an upper end of an outside wall of the protrusion 72 to contact and press a lower part of the convex part 70 of the door frame 14. A solid member 80 is embedded in the protrusion 72 so as to extend in a longitudinal direction of the base portion 74. The solid member 80 has a rounded and approximately rectangular cross-section to conform to the cross-section of the protrusion 72.

Figure 6:
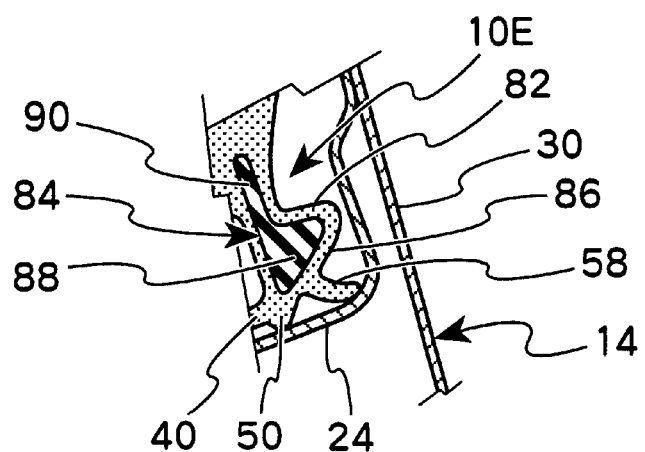
FIG. 6 is a cross-sectional view of a main part of a third embodiment of a weather strip in accordance with the present invention, which is taken, similarly to FIG. 4.

FIG. 6 is a cross-sectional view of an outside lower end of a weather strip 10E of a third embodiment of the present invention. Configurations of the third embodiment are substantially identical to those of the first embodiment of FIG. 4, except for the cross-section of the solid member. In the present embodiment, a solid member 84 having an approximately thick L-shaped cross-section is used. A main part 88 of the solid member 84 has a cross-section approximately identical to that of the solid member 58 (FIG. 4), and is embedded in a protrusion 86 which has a cross-section approximately identical to that of the protrusion 52(FIG. 4). A vertical part 90 of the solid member 84 stands upright on an inside upper end of the main part 88 integrally therewith, and is embedded in an upper end portion of the base portion 40 upwardly of the protrusion 86. The vertical part 90 has such a height as to reach an upper end of a base portion 40 and extend toward the sub-seal lip portion 44 (FIG. 4).

Figure 1:
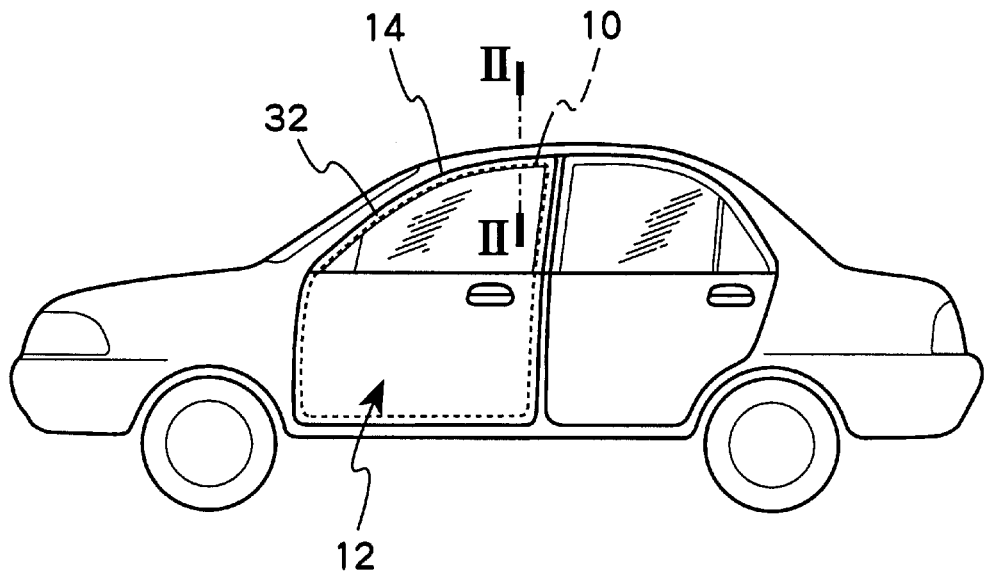
FIG. 1 is a side view of a motor vehicle.
Figure 2:
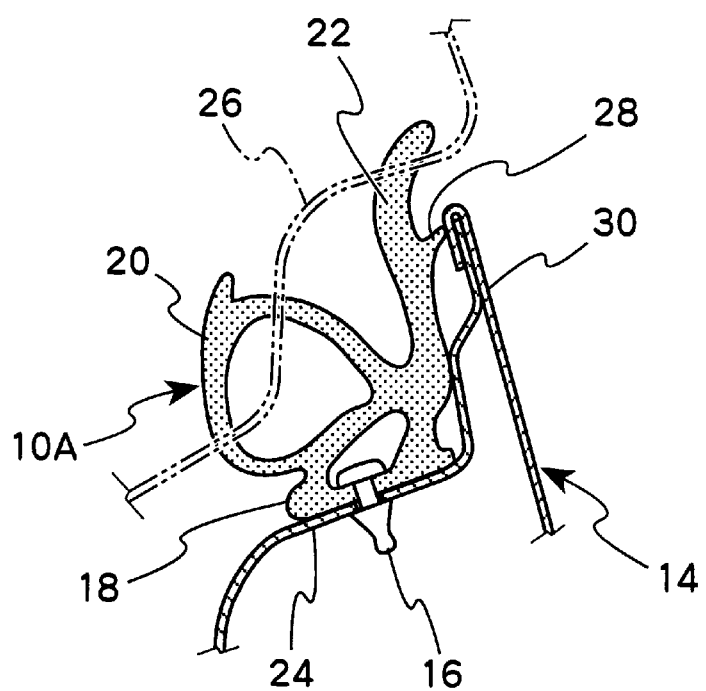
FIG. 2 is a cross-sectional view of a conventional weather strip attached to a door frame, which is taken along the line II—II of FIG. 1.
Figure 3:
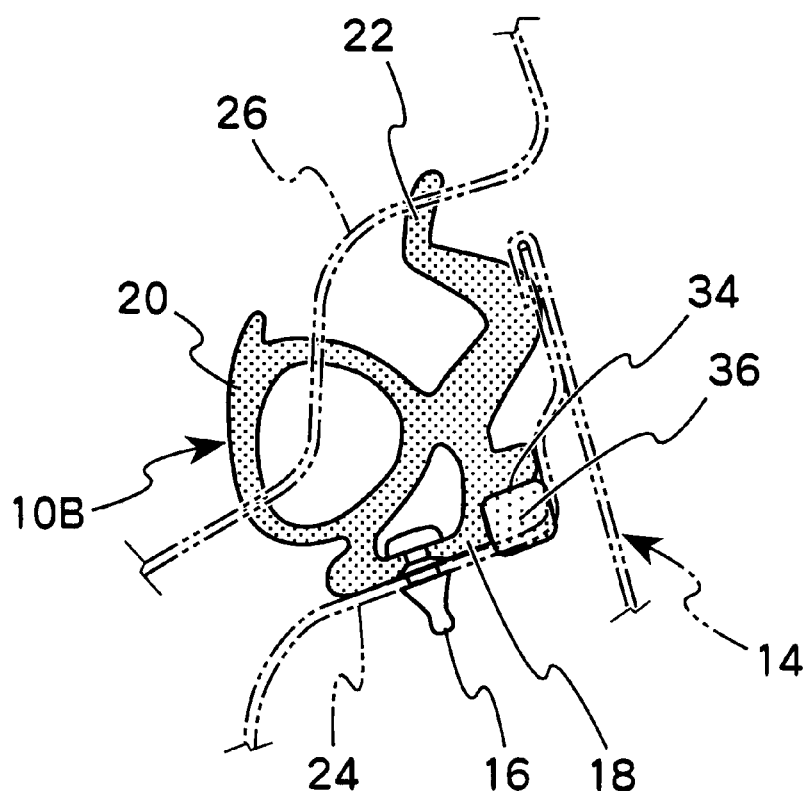
FIG. 3 is a cross-sectional view of another conventional weather strip attached to a door frame, which is taken, similarly to FIG. 2.

Generally, weather strips are secured to door frames with clips while applying tension thereto in longitudinal directions thereof. When the weather strip 10C is attached to the upper frame part 32 (FIG. 1) of the door frame 14, which curves along a side of a vehicle roof, the seal portions 42 and 44 located on radially outside of the curved weather strip 10C. Since tension force is also applied to the seal portions 42 and 44, they are stretched with the result that the tubular main seal portion 42 may collapse while the sub-seal lip portion 44 may fall down.

In contrast, with the present embodiment, by virtue of the vertical part 90 of the solid member 84, which extends upwardly to the vicinity of the seal portions 42 and 44, the curving center of the weather strip 10E shifts upwardly towards the seal portions 42 and 44. Accordingly, when the weather strips are attached to the upper frame part 32, stretching of the sealing portions 42 and 44 is restrained, and undesirable deformations of the seal portions 42 and 44 can be reduced.

As described above, in accordance with the present invention, in the weather strip for attachment to the door frame with clips, a water-stopping lip can apply a uniform and sufficient pressing force against a door frame over the entire length of the weather strip even between clips, and consequently, water can be prevented from leaking into a vehicle compartment via a space between a base portion of the weather strip, and the door frame.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A weather strip for a door of a motor vehicle, comprising:
   a base portion adapted to be secured to a periphery of a door frame of the door with clips, wherein said base portion has a protrusion, which protrudes outwardly of clip-securing positions of said base portion;
   a seal portion for contacting and pressing a door opening portion of a body of the vehicle upon closing the door;
   a water-stopping lip formed integrally with said protrusion at an end of said base portion outside said clip-securing positions of said base portion such that a projecting end of said water-stopping lip is adapted to contact and press said door frame upon attachment of the weather strip to said door frame; and
   a solid member for ensuring a pressing force of said water-stopping lip against said door frame, said solid member being embedded in the end of said base portion at which said water-stopping lip is formed, wherein said solid member extends in a longitudinal direction of the weather strip and has an approximately L-shaped cross section, and said solid member integrally includes a main part which is embedded in said protrusion, and a vertical part which stands upright on an upper end of said main part and is embedded in an upper end portion of said base portion upwardly of said protrusion.

2. A weather strip as claimed in claim 1, wherein said base portion and said seal portion are composed of one of foamed rubber and foamed thermoplastic elastomer, and wherein said solid member is composed of one of non-foamed rubber and non-foamed thermoplastic elastomer.

3. A weather strip as claimed in claim 1, wherein said base portion and said seal portion are composed of one of foamed rubber and foamed thermoplastic elastomer, and wherein said solid member is composed of one of foamed rubber and foamed thermoplastic elastomer having an expansion smaller than an expansion of said base portion and said seal portion.

4. A weather strip for a door of a motor vehicle, comprising:
   a base portion adapted to be secured to a periphery of a door frame of the door with clips said base portion having a protrusion, which protrudes outwardly of clip-securing positions of said base portion, wherein said protrusion has an approximately triangular cross-section, and wherein a lower surface of said protrusion is adapted to extend obliquely to said periphery of said door frame when said weather strip is attached to said door frame;
   a seal portion for contacting and pressing a door opening portion of a body of the vehicle closing the door;
   a water-stopping lip formed integrally with said protrusion such that a projecting end of said water-stopping lip is adapted to contact and press said door frame outside said clip-securing positions of said base portion upon attachment of the weather strip to said door frame, wherein said water-stopping lip projects from said lower surface of said protrusion approximately perpendicularly to said lower surface; and
   a solid member for ensuring a pressing force of said water-stopping lip against said door frame, wherein said solid member has a cross-section approximately similar to that of said protrusion, wherein said solid member is embedded in said protrusion and extends in a longitudinal direction of said base portion, and wherein said base portion and said seal portion are comprised of one of foamed rubber and foamed thermoplastic elastomer, and said solid member is comprised of one of non-foamed rubber and non-foamed thermoplastic elastomer.

5. A weather strip for a door of a motor vehicle, comprising:
   a base portion adapted to be secured to a periphery of a door frame of the door with clips wherein said base portion has a protrusion, which protrudes outwardly of clip-securing positions of said base portion and has an approximately rectangular cross-section;
   a seal portion for contacting and pressing a door opening portion of a body of the vehicle upon closing the door;
   a water-stopping lip formed integrally with said protrusion such that a projecting end of said water-stopping lip is adapted to contact and press said door frame outside said clip-securing positions of said base portion upon attachment of said weather strip to said door frame, wherein said water-stopping lip stands upright on an upper end of an outside wall of said protrusion for contacting and pressing a lower part of a convex part formed in said door frame when said weather strip is attached to said door frame; and
   a solid member for ensuring a pressing force of said water-stopping lip against said door frame, said solid member has an approximately rectangular cross-section, which conforms to the cross-section of said protrusion, wherein said solid member is embedded in said protrusion and extends in a longitudinal direction of said base portion, said base portion and said seal portion being composed of one of foamed rubber and foamed thermoplastic elastomer, and said solid member being comprised of non-foamed rubber and non-foamed thermoplastic elastomer.

* * * * *